United States Patent
Sundstrom et al.

(10) Patent No.: US 9,881,186 B1
(45) Date of Patent: Jan. 30, 2018

(54) WEAK RFID TAG SIGNAL RECOVERY FROM COLLISIONS

(71) Applicant: Impinj, Inc., Seattle, WA (US)

(72) Inventors: Kurt Eugene Sundstrom, Woodinville, WA (US); Jayasuryan Iyer, Bellevue, WA (US)

(73) Assignee: IMPINJ, INC., Seattle, WA (US)

( * ) Notice: Subject to any disclaimer, the term of this patent is extended or adjusted under 35 U.S.C. 154(b) by 0 days.

(21) Appl. No.: 15/627,521

(22) Filed: Jun. 20, 2017

Related U.S. Application Data

(63) Continuation of application No. 14/938,875, filed on Nov. 12, 2015, now Pat. No. 9,715,605.

(60) Provisional application No. 62/080,205, filed on Nov. 14, 2014.

(51) Int. Cl.
*H04Q 5/22* (2006.01)
*G06K 7/10* (2006.01)

(52) U.S. Cl.
CPC .............................. *G06K 7/10019* (2013.01)

(58) Field of Classification Search
CPC ............................................... G06K 7/10019
USPC .......... 340/5.1–5.7, 10.1–10.5, 572.1–572.9; 235/375–385
See application file for complete search history.

(56) References Cited

U.S. PATENT DOCUMENTS

| | | | | |
|---|---|---|---|---|
| 6,950,009 B1* | 9/2005 | Nysen | .................... | G01S 13/755 340/10.1 |
| 8,902,045 B1* | 12/2014 | Linn | ....................... | G06F 21/32 340/5.53 |
| 9,357,426 B2* | 5/2016 | Abdelmonem | ....... | H04L 5/0026 |
| 2008/0075033 A1* | 3/2008 | Shattil | ..................... | H04B 7/026 370/328 |
| 2008/0231424 A1* | 9/2008 | Arnitz | .................. | G06K 7/0008 340/10.1 |
| 2014/0269374 A1* | 9/2014 | Abdelmonem | ....... | H04L 5/0026 370/252 |
| 2015/0023202 A1* | 1/2015 | Shattil | ................. | H04W 52/267 370/252 |
| 2015/0319768 A1* | 11/2015 | Abdelmonem | ......... | H04L 5/006 455/452.1 |
| 2016/0110569 A1* | 4/2016 | Konishi | ............... | G06K 7/0008 340/10.2 |

* cited by examiner

*Primary Examiner* — Ojiako Nwugo
(74) *Attorney, Agent, or Firm* — Turk IP Law, LLC

(57) ABSTRACT

RFID readers may be configured to recover weak RFID tag signals from collisions with stronger RFID tag signals. An RFID reader may receive a combined tag response including a strong tag response and a weak tag response. The reader recovers the strong and weak tag responses using source separation. In one example, the reader may recover the strong tag response from the combined tag response and remove the recovered tag response from the combined tag response to form a modified tag response. The reader may then recover the weak tag response from the modified tag response.

20 Claims, 12 Drawing Sheets

SIGNAL PATH DURING R→T

SIGNAL PATH DURING T→R

1200

TIME ↓

| 1230 TAG 1 | 1240 TAG 2 | 1210 READER |

1212 QUERY

1232 RN16_1

1242 RN16_2

1214 RECEIVE COLLIDED REPLY WAVEFORM WITH RN16_1 AND RN16_2

1216 RECOVER RN16_1 AND RN16_2 USING SOURCE SEPARATION

1218 ACKNOWLEDGE WITH RN16_1 AND OPTIONALLY RN16_2

1234 REPLY1

1244 REPLY2

1220 RECEIVE COLLIDED REPLY WAVEFORM WITH REPLY1 AND REPLY2

1222 RECOVER REPLY1 AND REPLY2 USING SOURCE SEPARATION

FIG. 12

WEAK RFID TAG SIGNAL RECOVERY FROM COLLISIONS

CROSS REFERENCE TO RELATED APPLICATIONS

This application is a continuation under 35 U.S.C §120 of co-pending U.S. patent application Ser. No. 14/938,875 filed on Nov. 12, 2015, which claims the benefit of U.S. Provisional Patent Application Ser. No. 62/080,204 filed on Nov. 14, 2014. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to the recovery of weak RFID tag signals from collisions with stronger RFID tag signals. An RFID reader may receive a combined tag response including a strong tag response and a weak tag response. The reader recovers the strong tag response from the combined tag response and removes the recovered tag response from the combined tag response to form a modified tag response. The reader may then recover the weak tag response from the modified tag response.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 12 is a diagram depicting an example interaction between an RFID reader and multiple RFID tags involving the recovery of multiple tag replies from a single collided reply waveform, according to embodiments.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GSI EPCglobal, Inc. ("Gen2 Specification"), versions 1.2.0 and 2.0 of which are hereby incorporated by reference.

Figure 1:
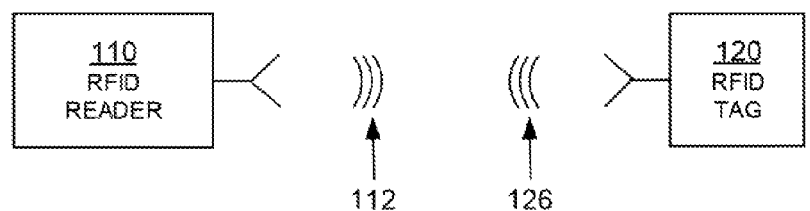
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
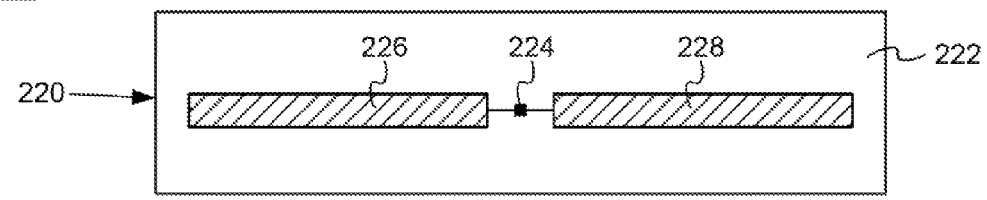
FIG. 2 is a diagram showing components of a passive RFID tag, such as a tag that can be used in the system of FIG. 1.
Figure 2:
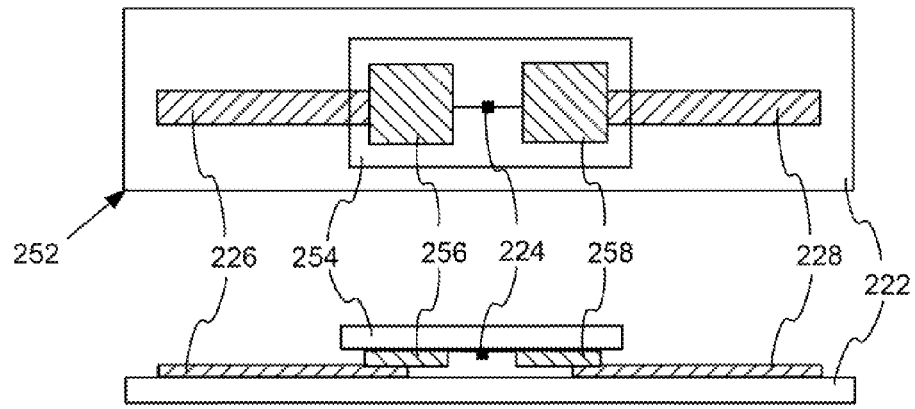
Figure 2:
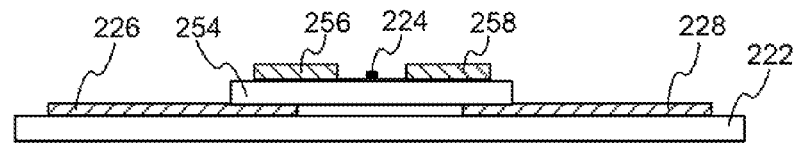

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 12 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
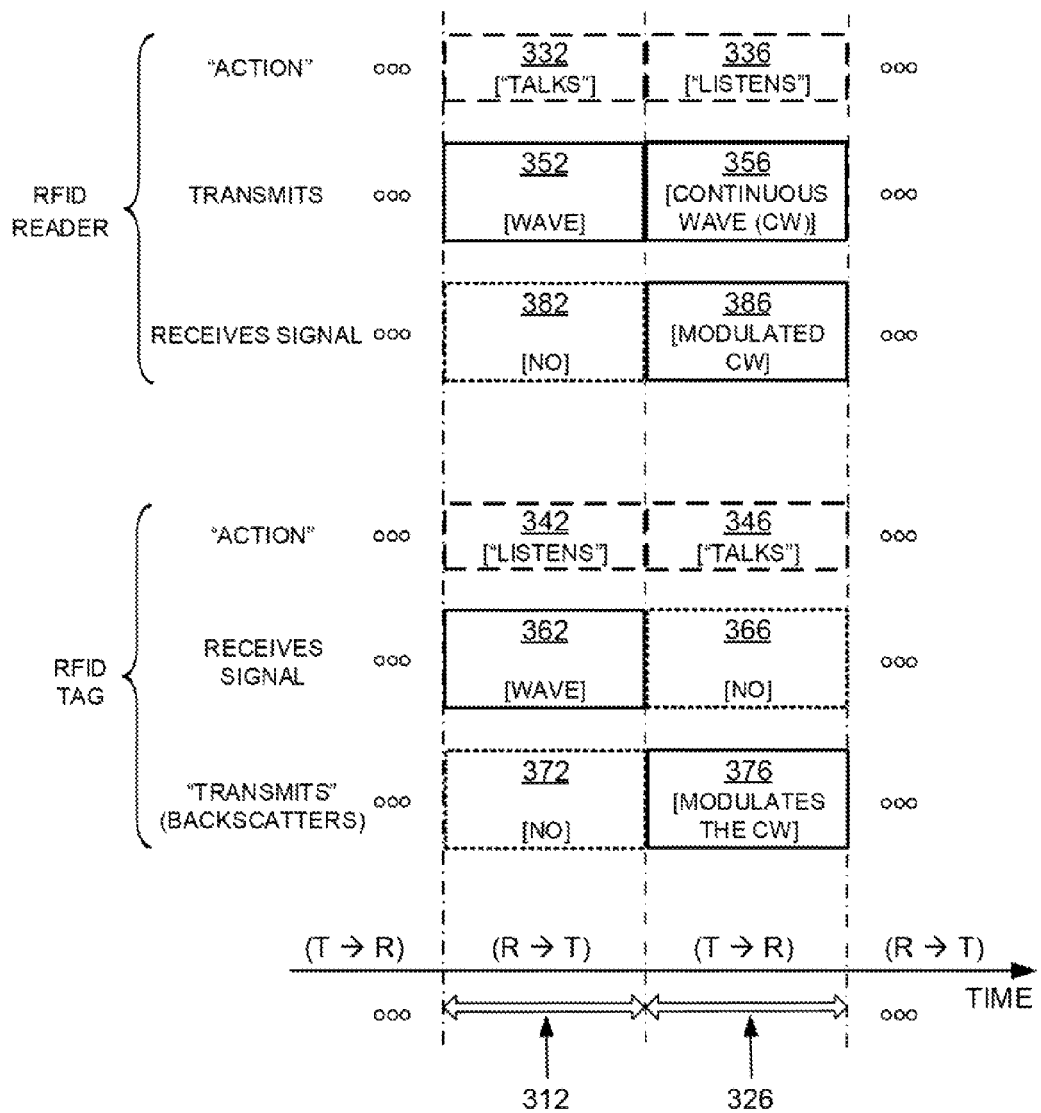
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
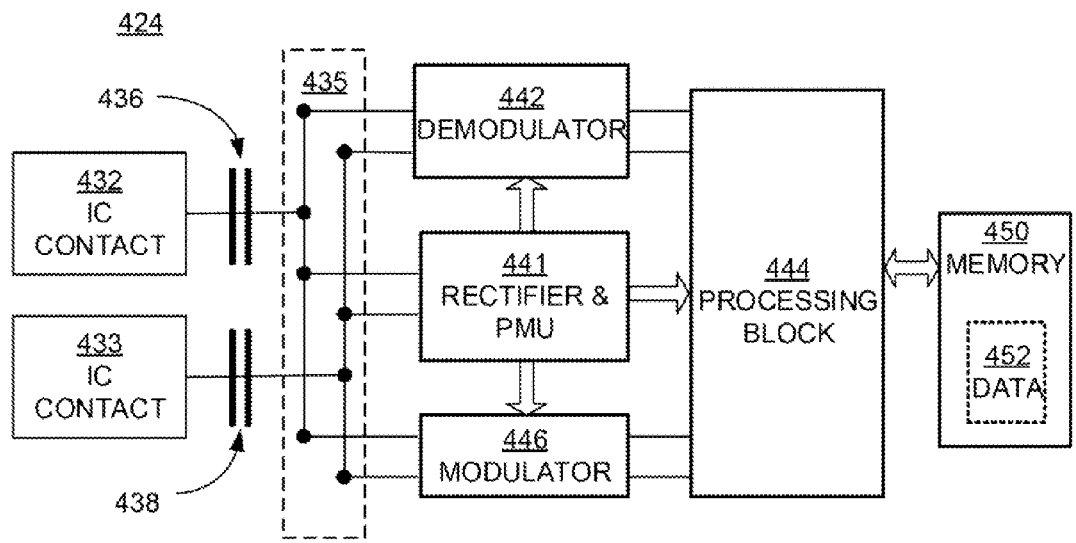
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
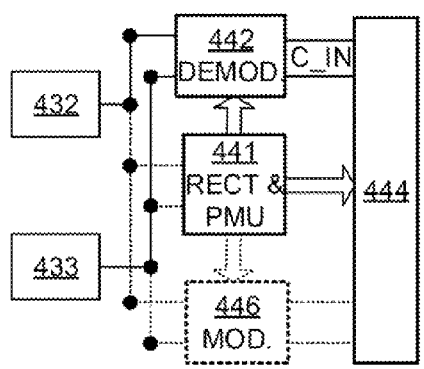
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
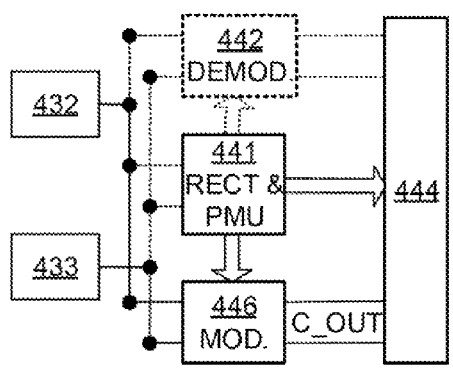

FIG. 5B shows version 524-B of components of circuit 424 of FIG. 4, further modified to emphasize a signal operation during a T-R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
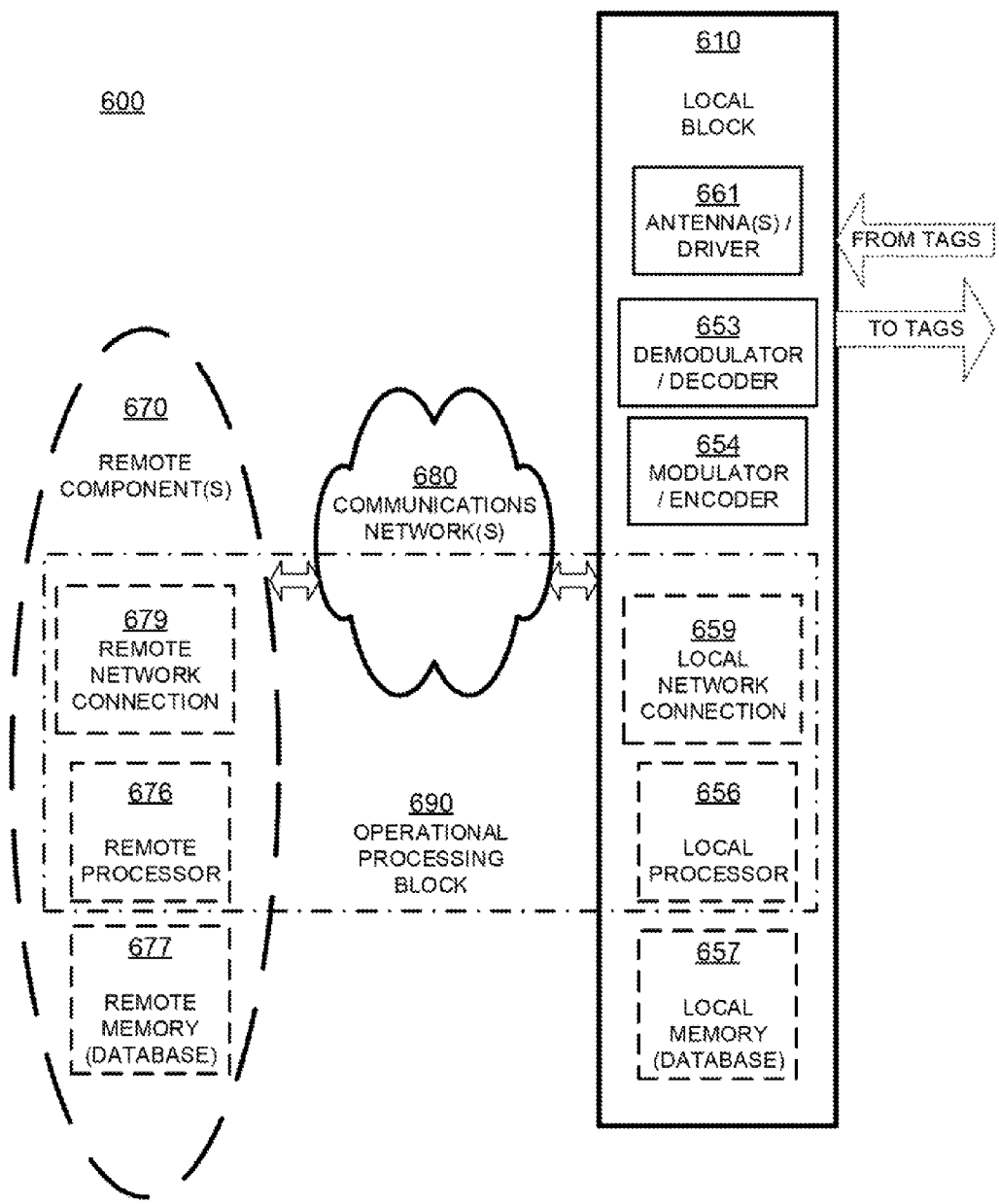
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with the tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an authentication function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

Of the above-described elements, it may be useful to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
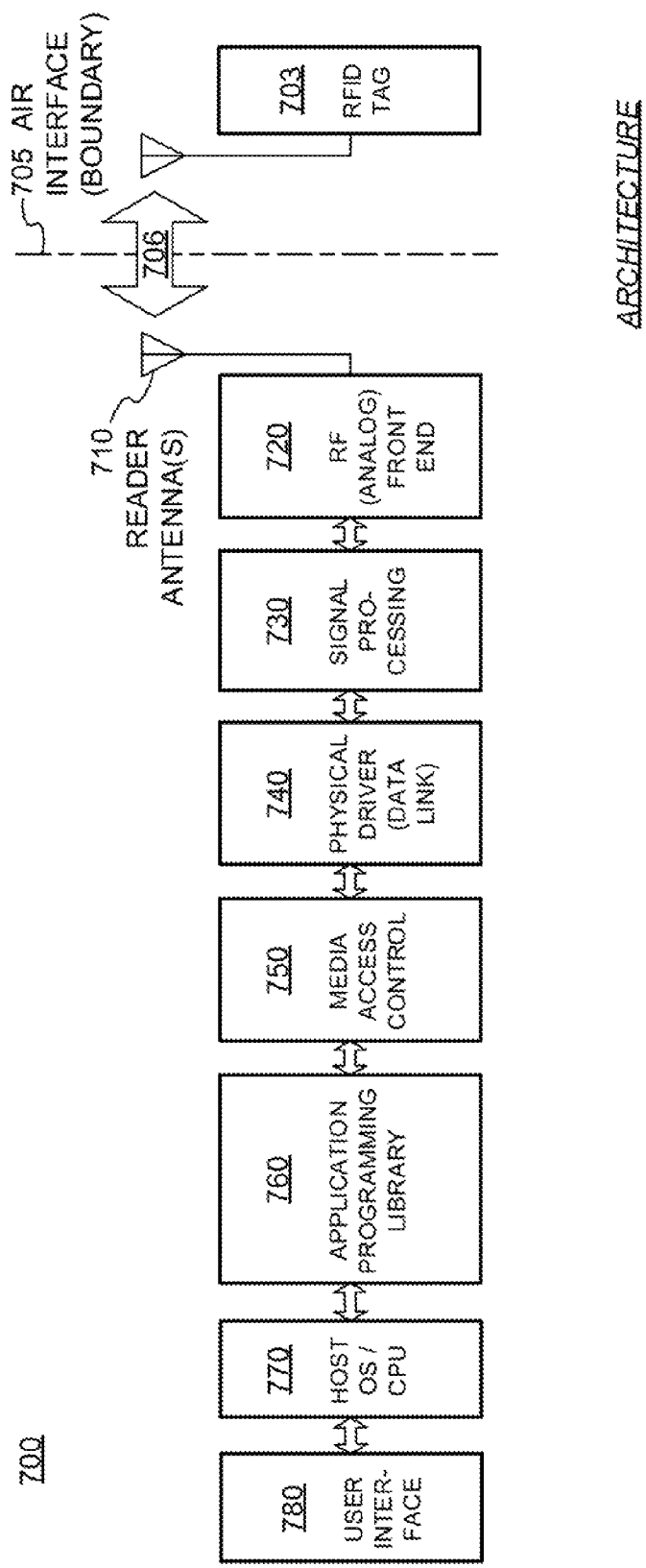
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

Embodiments additionally include programs, and methods of operation of the programs. A program is generally defined as a group of steps or operations leading to a desired result, due to the nature of the elements in the steps and their sequence. A program is may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

As described above, RFID techniques may entail using an RFID reader to inventory one or more tags by successively singulating individual tags and receiving identifiers from the singulated tags. When a large tag population is present, an RFID reader may attempt to inventory all of the tags in the population. To do so, the reader may inventory a first tag and instruct the first tag not to reply for a time duration by, for example, asserting or de-asserting a tag flag having a persistence time that corresponds to the time duration. The reader may then proceed to inventory a second tag. Ideally, the reader would continue this process until it has inventoried all of the tags in the population. Unfortunately, if the reader has not finished inventorying all of the tags within the persistence time then the tag flag at the first tag may decay. Accordingly, the first tag may "forget" that it was already inventoried, and may reply to subsequent inventorying requests. Subsequently, the second tag may exhibit the same behavior, followed by later tags. In situations where the tag population is large and some tags respond more strongly to inventorying requests than other, weaker tags, the reader may spend so much time re-inventorying strong, already-inventoried tags that it may not have sufficient time to search for the weaker, more-difficult-to-inventory tags. As a result, the reader may never inventory some of the weaker tags in the population.

Figure 8:
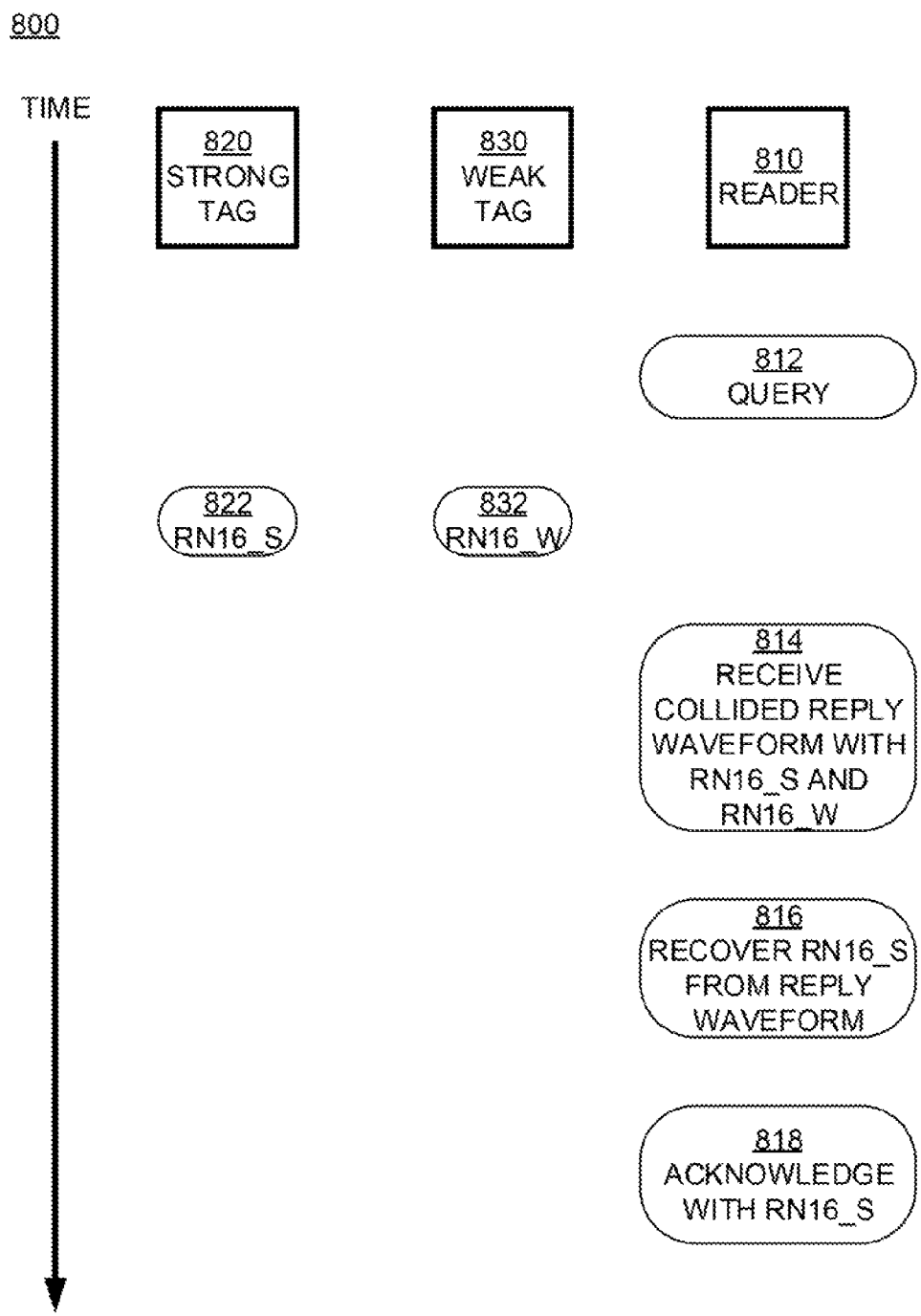
FIG. 8 is a diagram depicting an example query-acknowledgement interaction between an RFID reader and multiple RFID tags.

FIG. 8 is a diagram 800 depicting an example query-acknowledgement interaction between an RFID reader and multiple RFID tags. Diagram 800 depicts interactions between RFID reader 810, a strong RFID tag 820, and a weak RFID tag 830 as a function of time (as indicated by the downward arrow on the left, where later events occur below earlier events). The descriptors "strong" and "weak" may refer to the strength of an RF signal backscattered by a tag as perceived by the reader. For example, a tag positioned relatively close to the reader, oriented such that its antenna couples well to an RF signal from the reader, and/or lacking significant intervening obstructions may backscatter a "strong" tag signal. In contrast, a tag positioned relatively far from the reader, oriented such that its antenna does not couple well to the reader RF signal, and/or with significant intervening obstructions may backscatter a "weak" tag signal.

In an inventorying operation, reader 810 may begin at step 812 by transmitting a query command requesting an identifier from tags that match certain criteria. In some embodiments, the query command may be a Query, QueryAdj, or QueryRep command as described in the Gen2 Specification, and a Gen2 tag having a slot counter value of zero may respond with a 16-bit random number RN16.

In the diagram 800, both the strong tag 820 and the weak tag 830 may meet the certain criteria (for example, each may have slot counter values of zero). Accordingly, after detecting the query command both tags may backscatter an RN16, with strong tag 820 backscattering a strong RN16_S reply signal or waveform at step 822 and weak tag 830 backscattering a weak RN16_W reply signal or waveform at step 832. The tags 820 and 830 may backscatter their respective RN16 reply signals at substantially the same time, resulting in a reply collision. The collided reply waveform may include a complete superposition of the two RN16 reply signals, or may include a partial superposition of the two RN16 reply signals. In the latter situation, where some time delay is present from the beginning of one RN16 reply signal and another RN16 reply signal in the collided reply waveform, the time delay may cause the overall length of the collided reply waveform to be longer than the length of an uncollided reply waveform.

At step 814, reader 810 may receive a collided reply waveform that is at least partial superposition of the strong RN16_S reply signal and the weak RN16_W reply signal. In some embodiments, reader 810 is configured to filter noise from an incoming reply waveform in order to correctly recover the information encoded in that reply waveform. Accordingly, at step 816 the reader may process the collided reply waveform received in step 814 as a combination of the strong RN16_S reply signal and noise, which may include both the weak RN16_W reply signal and environmental/RF noise, and may apply digital signal processing techniques, e.g. matched filtering, noise cancellation, equalization, etc., to recover only the strong RN16_S reply signal. Subsequently, at step 818 reader 810 may acknowledge the strong tag 820 using, for example, an ACK command according to the Gen2 Specification. In some embodiments, reader 810 may transmit a NAK command to strong tag 820 instead of an ACK command, for example in order to ensure that strong tag 820 remains responsive in the same or subsequent inventory rounds.

As the example provided in FIG. 8 indicates, a reader may not be able to detect a weak tag reply if the weak tag reply collides with a strong tag reply. In situations where collisions are relatively common (for example in large tag populations), this may lead to difficulty in detecting weak tags, slowing or preventing complete inventorying of a tag population with strong and weak tags.

Figure 9:
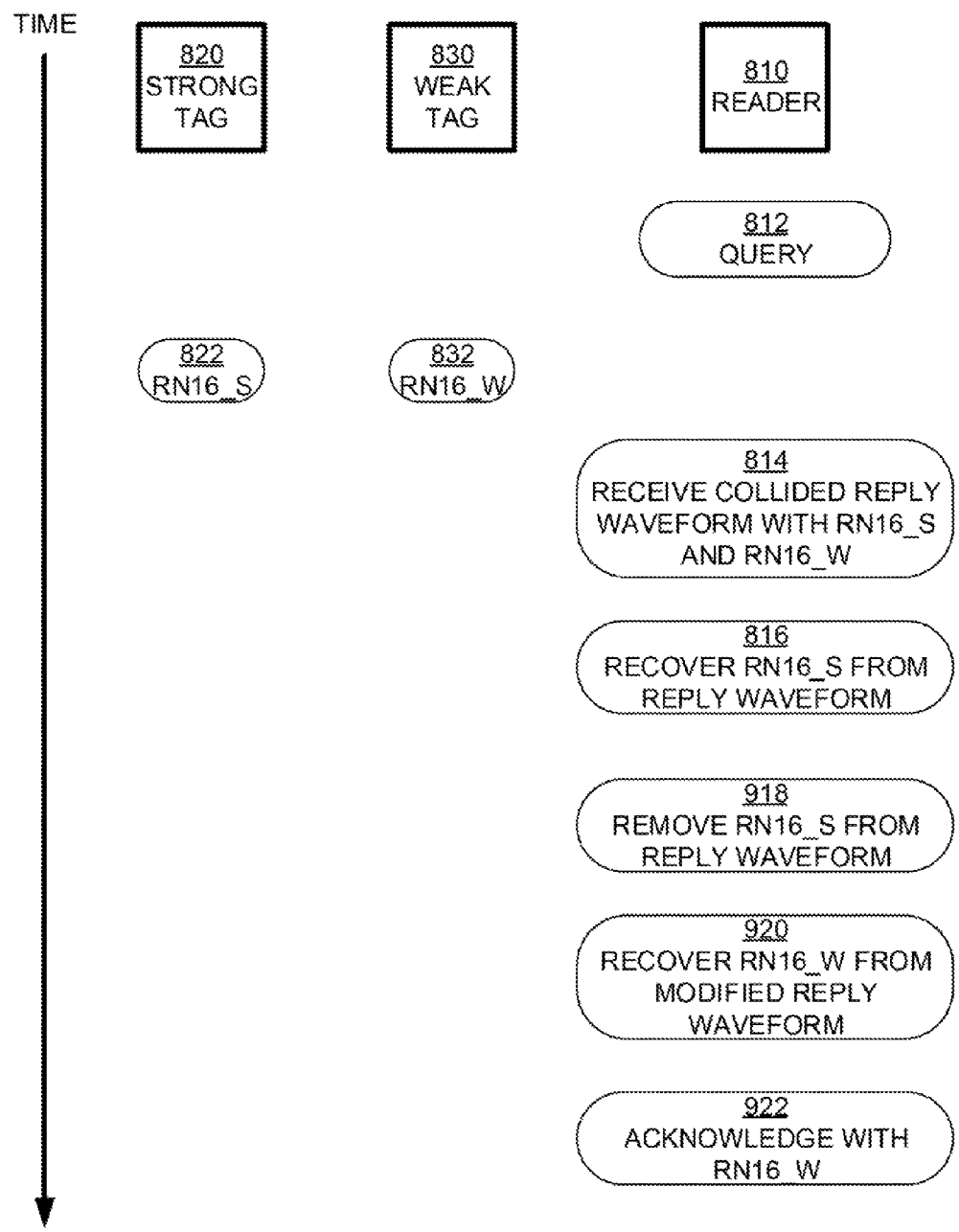
FIG. 9 is a diagram depicting an example query-acknowledgement interaction between an RFID reader and multiple RFID tags involving the recovery of a weaker tag reply signal from a collided reply waveform.

One method to recover a weak tag reply signal from a collision with a stronger tag reply signal may be to remove the stronger tag reply signal from the combined reply waveform and subsequently re-process the modified reply waveform to extract the weaker reply signal. FIG. 9 is a diagram 900 depicting an example query-acknowledgement interaction between an RFID reader and multiple RFID tags involving the recovery of a weaker tag reply signal from a collided reply waveform. Portions of diagram 900 are similar to diagram 800. For example, diagram 900 includes reader 810, strong tag 820, and weak tag 830, similar to diagram 800. Diagram 900 also includes steps 812 (reader 810 transmitting a query command), 822 (strong tag 820 backscattering a strong RN16_S reply signal), 832 (weak tag 830 backscattering a weak RN16_W reply signal), 814 (reader 810 receiving the collided reply waveform), and 816 (reader 810 recovering the RN16_S reply signal from the collided reply waveform), each of which are similar to the corresponding steps in diagram 800.

However, instead of then acknowledging the strong tag 820, at step 918 reader 810 removes the recovered RN16_S reply signal from the collided reply waveform. Reader 810 may remove the recovered RN16_S reply signal from the collided reply waveform by simultaneously buffering and demodulating the collided reply waveform and using the symbol decisions and parameter estimates from the demodulated signal, i.e. the estimator corresponding to information recovered from the signal, to estimate (reconstruct) the original RN16_S reply waveform. Waveform reconstruction techniques may take the form of filtering or similar mathematical operations such as interpolation. The reconstructed RN16_S reply waveform may then be canceled (subtracted) from the buffered collided reply waveform. The RN16_S reconstruction operation may also be adaptive, employing information from the demodulator to improve the cancellation of the RN16_S reply from the collided reply waveform. For example, distortion detected in the collided reply waveform prior to or after removal of the RN16_S reply signal may be used to adjust the cancellation process. This cancellation may result in a modified reply waveform including the weak RN16_W reply and any environmental/RF noise. Subsequently, at step 920 reader 810 may apply digital signal processing techniques, e.g. matched filtering, noise cancellation, equalization, etc., to recover the weak RN16_W reply from the modified reply waveform, and at step 922 reader 810 may acknowledge the weak tag 830 instead of the strong tag 820.

Figure 10:
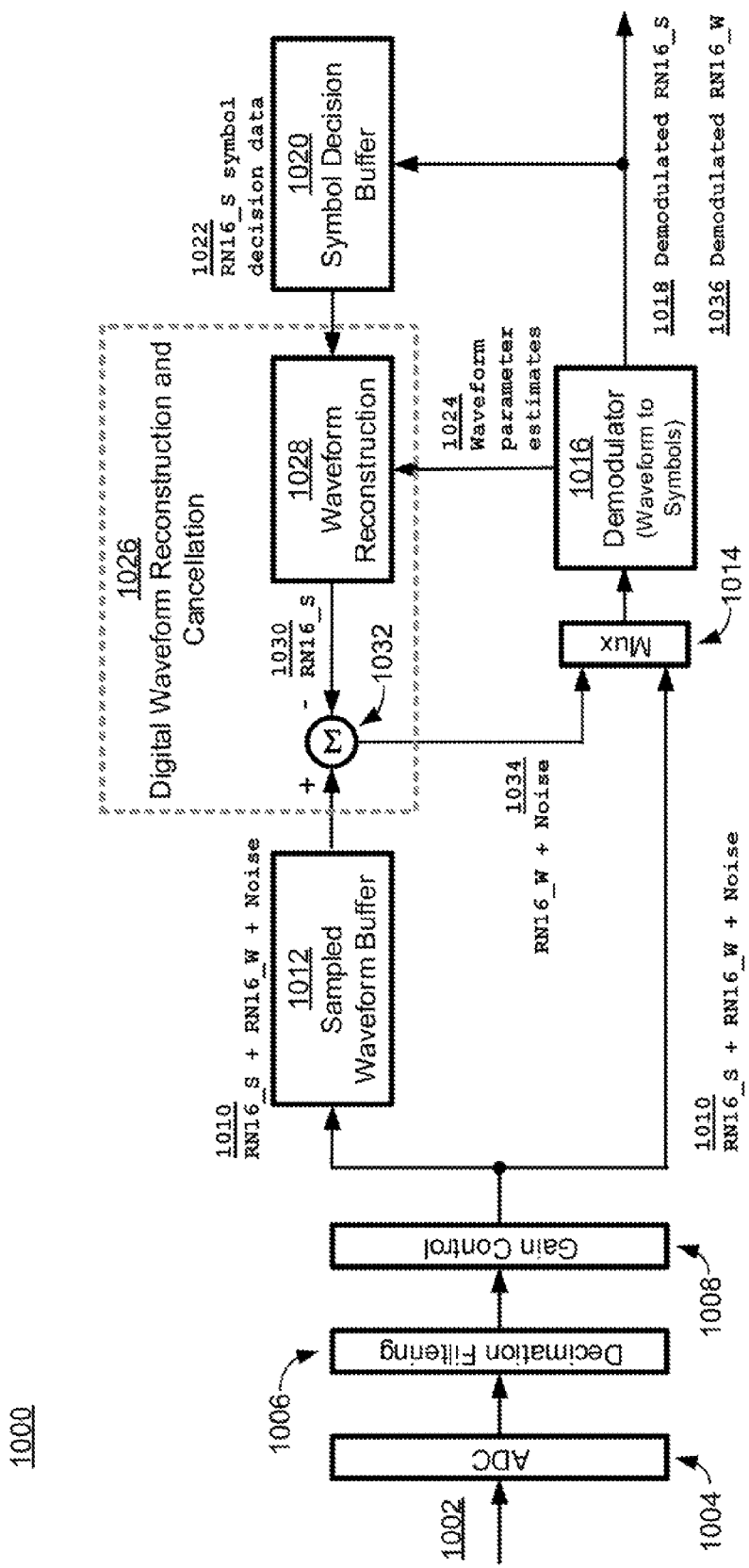
FIG. 10 is a block diagram illustrating an example system for recovering a weaker tag reply signal from a collided reply waveform.

FIG. 10 is a block diagram illustrating an example system 1000 for recovering a weaker tag reply signal from a collided reply waveform. In some embodiments, system 1000 may be implemented in a local block (e.g., local block 610) and/or at a signal-processing module (e.g., signal-processing module 730) of a reader system. System 1000 may be configured to receive an analog signal 1002, which may be a collided reply waveform combining one or more individual tag signals and/or environmental/RF noise. An analog-to-digital converter (ADC) 1004 may then convert the analog signal 1002 into a digital signal, which may then be filtered and/or adjusted by a decimation filtering module 1006 and a gain control module 1008, resulting in a signal 1010. In some embodiments, signal 1010 may be a superposition of a strong tag reply signal RN16_S, a weak tag reply signal RN16_W, and other noise.

System 1000 may then process the signal 1010 to recover a tag signal while also storing a copy of the signal 1010 in a sampled waveform buffer 1012. For signal processing, system 1000 may route signal 1010 to a multiplexer 1014, which may then route the signal 1010 to a demodulator 1016. Demodulator 1016, which may be similar to demodulator/decoder 653, may then attempt to recover symbols corresponding to a tag reply signal from the signal 1010. Demodulator 1016 may perform noise filtering and/or digital signal processing (e.g., matched filtering, noise cancellation, equalization, etc.) to recover symbols. In some embodiments, demodulator 1016 may determine an estimator that includes the symbols most likely to be encoded in signal 1010. If signal 1010 is a combination of RN16_S, RN16_W, and noise, demodulator 1016 may determine an estimator that includes the symbols corresponding to the stronger RN16_S reply signal, while discarding waveform components corresponding to the RN16_W reply signal and noise signal. Demodulator 1016 may then output the symbols (or estimator) corresponding to RN16_S as demodulated RN16_S symbols 1018, which are then routed to other tag-response-processing circuitry external to system 1000.

System 1000 may further use demodulated RN16_S symbols 1018 to attempt to recover other tag reply signals from signal 1010. In particular, the system 1000 may route demodulated RN16_S symbols 1018 to a symbol decision buffer 1020, which may store the symbols 1018, the estimator corresponding to symbols 1018, and/or information about how the symbols 1018 or estimator were determined as RN16_S symbol decision data 1022. Symbol decision buffer 1020 may then provide RN16_S symbol decision data 1022 to a digital waveform reconstruction and cancellation module 1026. Similarly, demodulator 1016 may provide waveform parameter estimates 1024 related to waveform characteristics of the recovered symbols 1018 to the module 1026. Such waveform characteristics may include tag response link frequency, tag response data rate, tag response signal energy (such as RSSI or received signal strength indicator), and/or the actual or estimated message encoded in the tag response.

Module 1026 may be configured to route decision data 1022 and waveform parameter estimates 1024 to waveform reconstruction module 1028, which in turn may be configured to estimate and reconstruct the original RN16_S reply waveform from the decision data 1022 and the waveform parameter estimates 1024. In some embodiments, waveform reconstruction module 1028 may be configured to reconstruct the original RN16_S reply waveform using filtering, mathematical operations such as interpolation, or any other suitable waveform reconstruction technique. Waveform reconstruction module 1028 may then route the reconstructed RN16_S reply signal 1030 to summing node 1032, which may subtract the RN16_S reply signal 1030 from the signal 1010 stored in sampled waveform buffer 1012 to form modified signal 1034. Modified signal 1034 may include the RN16_W reply signal and environmental/RF noise signal(s), but does not include the RN16_S reply waveform. System 1000 may then route modified signal 1034 to multiplexer 1014, which in turn may route modified signal 1034 to demodulator 1016.

Demodulator 1016, as described above, may then again attempt to recover symbols corresponding to a tag reply signal from the modified signal 1034, for example using noise filtering and/or digital signal processing (e.g., matched filtering, noise cancellation, equalization, etc.). Since modified signal 1034 is a combination of the RN16_W reply signal and noise, demodulator 1016 may recover symbols corresponding to the RN16_W reply while discarding the noise. Demodulator 1016 may then output the symbols (or estimator) corresponding to RN16_W as demodulated RN16_W symbols 1036, which may then be routed to other tag-response-processing circuitry external to system 1000.

In some embodiments, system 1000 may be configured to recover RN16_W after RN16_S is entirely recovered or during the recovery of RN16_S. In the former case, recovery of RN16_W may not occur until the entirety of RN16_S has been recovered, and symbol decision data 1022, waveform parameter estimates 1024, and/or RN16_S signal 1030 may be associated with all of the symbols in RN16_S. In the latter case, RN16_W may be recovered in a number of individual operations, each involving one or more symbols of RN16_S (but not all of RN16_S). For example, system 1000 may be configured to recover symbols of RN16_W as corresponding symbols of RN16_S are recovered. In this situation, symbol decision data 1022, waveform parameter estimates 1024, and/or RN16_S signal 1030 may be associated with one or more (but not all) of the symbols of RN16_S, and may change as additional RN16_S symbols are recovered. In other embodiments, RN16_W may be recovered during the recovery of RN16_S using other source separation techniques (as described below) in addition to or instead of symbol-by-symbol recovery.

Figure 11:
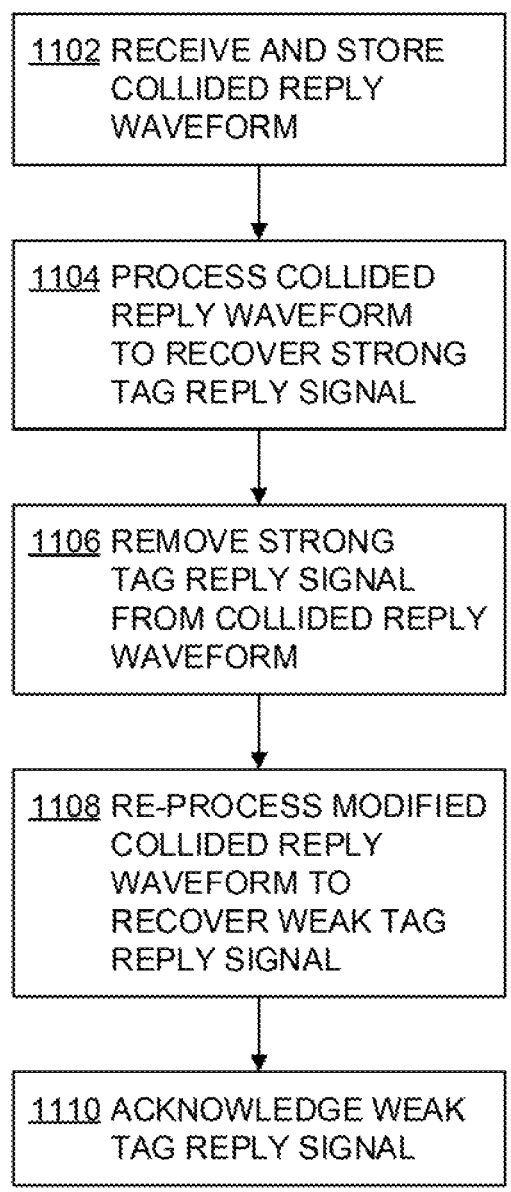
FIG. 11 is a flowchart depicting a process for responding to weak RFID tag reply signals.

FIG. 11 is a flowchart depicting a process 1100 for responding to weak RFID tag reply signals. Process 1100 begins at step 1102, where a reader (for example, reader 810) receives and stores a collided reply waveform. At step 1104, the reader may process the received collided reply waveform to recover a strong tag reply signal by, for example, filtering and rejecting noise in the received collided reply waveform. At step 1106, the reader may remove the recovered strong tag reply signal from the stored collided reply waveform (or a copy of the stored collided reply waveform) to form a modified collided reply waveform without the strong tag reply signal. At step 1108, the reader may re-process the modified collided reply waveform to recover a weak tag reply signal, and at step 1110 the reader may acknowledge the weak tag reply signal, as described above.

The weak tag reply recovery process described above is an example of source separation, in which multiple source signals are separated from a set of mixed signals. Such source separation may be based on some known information about the source signals and/or the mixing process, or may be based on little or no information. Source separation in the latter case may be known as "blind source separation", or BSS. Source separation may be implemented using, for example, principal, independent, or dependent component analysis (PCA, ICA, and DCA, respectively), singular value decomposition (SVD), non-negative matrix factorization (NMF), stationary subspace analysis, common spatial pattern analysis, and/or any other suitable technique or combination of techniques.

FIG. 12 is a diagram 1200 depicting an example interaction between an RFID reader and multiple RFID tags involving the recovery of multiple tag replies from a single collided reply waveform, according to embodiments. Diagram 1200, somewhat similar to diagrams 800 and 900, depicts interactions between RFID reader 1210, a first RFID tag 1230, and a second RFID tag 1240 as a function of time. At step 1212, reader 1210 transmits a query command requesting an identifier from tags that match certain criteria, similar to step 812 in diagram 800. Both the first tag 1230 and the second tag 1240 meet the certain criteria, and respond to the query command. First tag 1230 responds with an RN16_1 reply signal at step 1232 and second tag 1240 responds with an RN16_2 reply signal at step 1242.

Similar to diagrams 800 and 900, tags 1230 and 1240 may respond at substantially the same time, and as a result at step 1214 reader 1210 receives a collided reply waveform that includes at least a partial superposition of the RN16_1 and the RN16_2 reply signals. At step 1216, reader 1210 may attempt to recover the individual RN16_1 and RN16_2 reply signals using source separation. For example, reader 1210 may use the tag signal recovery process described above in FIGS. 9-11, in which multiple signals are subtracted from a mixed signal, serially or at least partially in parallel. In some embodiments, one or more other source separation techniques as described above may be used.

Upon recovering the RN16_1 and RN16_2 reply signals, at step 1218 reader 1210 may use the recovered reply signals to acknowledge one or more of the corresponding tags. For example, reader 1210 may acknowledge tag 1230 based on the RN16_1 reply signal, may acknowledge tag 1240 based on the RN16_2 reply signal, or may acknowledge both tags 1230 and 1240. As described above, in some embodiments reader 1210 may use ACK or NAK commands according to the Gen2 Specification to acknowledge tag 1230 and/or tag 1240. For example, reader 1210 may use NAK commands to acknowledge tags 1230 and/or 1240 to ensure that one or both tags remain responsive in the same or subsequent inventorying rounds.

In the event that reader 1210 acknowledges both tags 1230 and 1240, tags 1230 and 1240 may both respond. For example, tag 1230 may transmit a first reply at time 1234 and tag 1240 may transmit a second reply at time 1244. In some embodiments, tags 1230 and 1240 may respond at substantially the same time, and as a result at optional step 1220 reader 1210 may receive a collided reply waveform that is at least a partial superposition of the two tag replies. Subsequently, at optional step 1222 reader 1210 may use source separation to recover the individual tag replies, similar to how RN16_1 and RN16_2 are recovered at step 1216. The individual tag replies may include identifiers, such as random numbers, tag identifiers, or electronic product codes, data stored or sensed by the tags, or any suitable information of combination of information.

Figure 13:
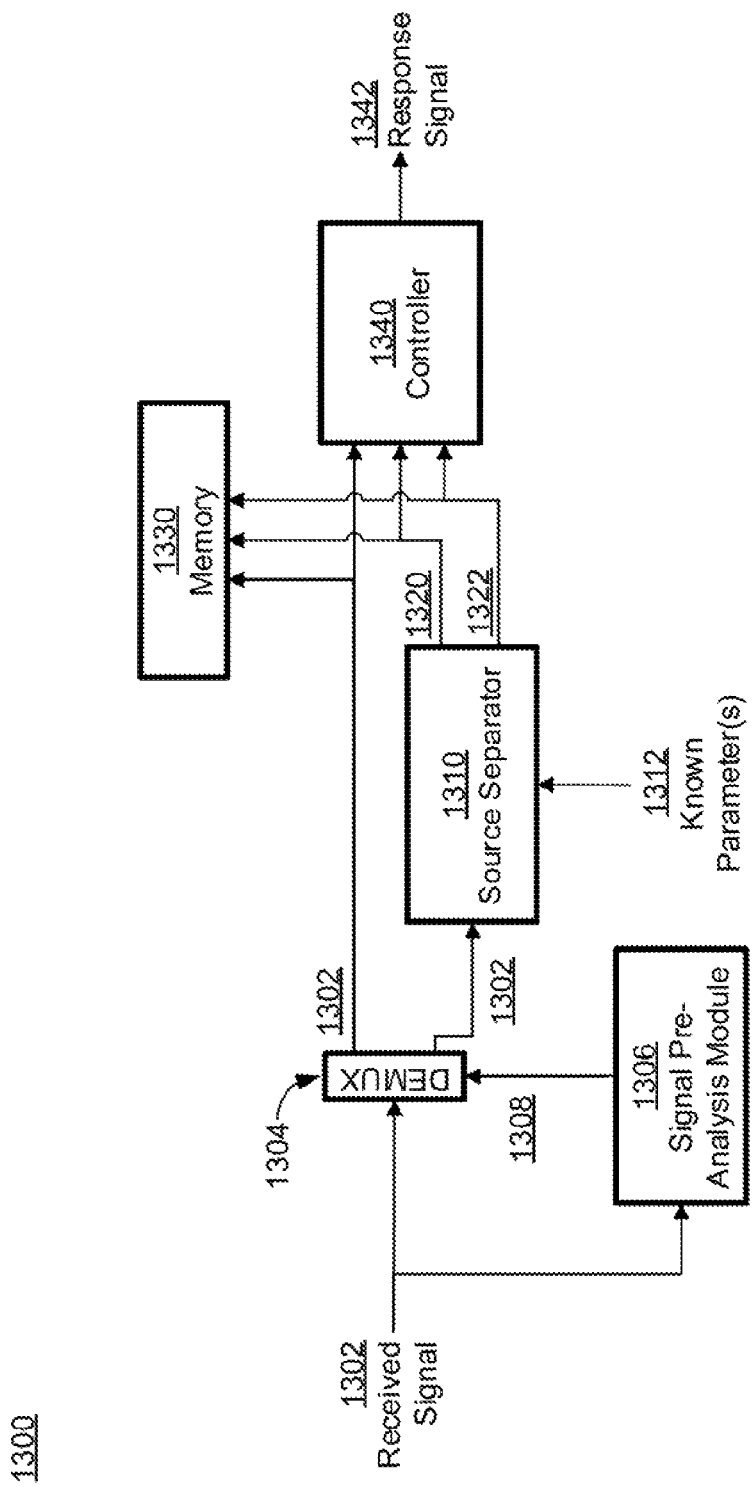
FIG. 13 is a block diagram illustrating an example system for recovering multiple tag reply signals from a collided reply waveform.

FIG. 13 is a block diagram illustrating an example system 1300 for recovering multiple tag reply signals from a collided reply waveform. In some embodiments, system 1300 may be implemented in a local block (e.g., local block 610) and/or at a signal-processing module (e.g., signal-processing module 730) of a reader system. System 1300 may be configured to receive a signal 1302, which may include a reply from a single tag or collided replies from multiple tags. Received signal 1302, which may be analog or digital, and may be filtered and/or otherwise adjusted, may then be provided to both demultiplexer 1304 and signal pre-analysis module 1306. Signal pre-analysis module 1306 may determine whether received signal 1302 is likely to be a collided reply waveform. In some embodiments, signal pre-analysis module 1306 may determine whether received signal 1302 is likely to be a collided reply waveform based on one or more response characteristics. Response characteristics may include overall signal strength/power or variation thereof, signal noisiness, signal shape, signal length, signal phase, signal angle-of-arrival, signal peak-to-average ratio, signal spectrum, signal bandwidth, signal amplitude variation, or any other suitable signal indicator or parameter. For example, a collided reply waveform may exhibit multiple different signal amplitudes corresponding to portions of the waveform with no signal amplitude, with signal amplitude corresponding to a single tag reply, with signal amplitude corresponding to two summed tag replies, etc.). As another example, a collided reply waveform may exhibit different power levels at different portions of the waveform, such as a relatively high power during a waveform portion where different replies may encode the same data and sum coherently (e.g., a preamble) and a relatively low power during another waveform portion where different replies may encode different data (e.g., a reply payload). If signal pre-analysis module 1306 determines that received signal 1302 is likely to be a collided reply waveform, it may send control signal 1308 instructing demultiplexer 1304 to route received signal 1302 to source separator 1310. On the other hand, if signal pre-analysis module 1306 determines that received signal 1302 is not likely to be a collided reply waveform, it may send control signal 1308 instructing demultiplexer 1304 to route received signal 1302 to controller 1340. In some embodiments, demultiplexer 1304 may also route received signal 1302 to memory 1330 for storage.

Source separator 1310 may then attempt to derive multiple reply signals from received signal 1302 using one or more of the source separation techniques mentioned above. For example, source separator 1310 may use principal component analysis and/or independent component analysis to derive multiple reply signals from received signal 1302. Source separator 1310 may perform source separation with little or no information (i.e., perform BSS), or may use one or more known parameters 1312. Known parameters 1312 may include information about the waveform or the data encoded in an uncollided reply signal. For example, an uncollided reply signal may have a particular waveform shape or amplitude, or may encode certain, known data, and source separator 1310 may use the known waveform shape, amplitude and/or encoded data to recover one or more reply signals from received signal 1302. In one embodiment, an uncollided reply signal may include data and an associated error check or correction code (e.g., a cyclic redundancy check or CRC), and source separator 1310 may be able to recover reply signals based on the known relationship between the data and the error check/correction code.

Source separator 1310, upon recovering one or more reply signals from received signal 1302, may provide the recovered reply signals to controller 1340 and memory 1330. For example, source separator 1310 may recover two reply signals 1320 and 1322 from received signal 1302, and may provide the reply signals 1320 and 1322 to controller 1340 and memory 1330.

Controller 1340 may then use the reply signals 1302, 1320, and/or 1322 to form response signal 1342. In some embodiments, controller 1340 may determine whether to respond to a single tag or to multiple tags, and may form response signal 1342 accordingly. For example, as described above in FIG. 12, controller 1340 may form an acknowledgement signal to acknowledge a single tag or multiple tags. In some embodiments, controller 1340 may form multiple acknowledgement signals intended for multiple tags, and may cause the acknowledgement signals to be serially transmitted.

In some embodiments, a received signal may be provided directly to a source separator without determining whether the received signal is likely to contain collided reply signals. Such a system may not include demultiplexer 1304 or signal pre-analysis module 1306, and may instead route received signal 1302 directly to source separator 1310.

Figure 14:
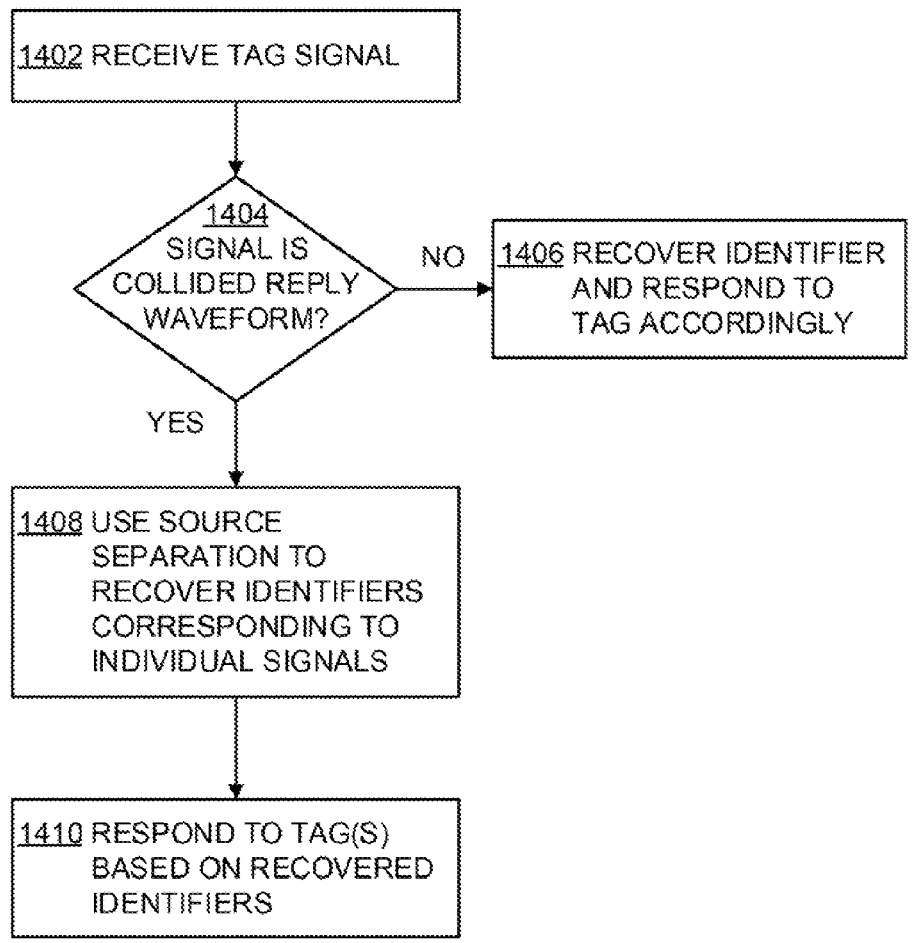
FIG. 14 is a flowchart depicting a process for responding to tags based on identifiers recovered using source separation.

FIG. 14 is a flowchart depicting a process 1400 for responding to tags based on identifiers recovered using source separation. Process 1400 begins at step 1402, where a reader (for example, reader 1210) receives a tag signal. At step 1404, the reader may determine whether the received tag signal is a collided reply waveform that includes replies from different tags. For example, a signal pre-analysis module (e.g., module 1306) may be used to determine whether the received tag signal is a collided reply waveform.

If at step 1404 the received tag signal is deemed unlikely to contain multiple tag reply signals, then at step 1406 the reader may recover a tag identifier (for example, a random number, an electronic product code, and/or any other suitable identifier or combination of identifiers) from the received tag signal and respond to the identified tag accordingly. For example, the reader may form and transmit an acknowledgement command based on the recovered tag identifier.

On the other hand, if at step 1406 the received tag signal is deemed likely to be a combination of multiple tag reply signals, then at step 1408 the reader uses source separation to recover multiple identifiers, each corresponding to a particular tag reply signal within the received tag signal. For example, the reader may use a source separator such as source separator 1310 described above. The source separation may be blind, or may involve one or more known parameters (e.g., known parameters 1312).

Subsequently, at step 1410 the reader may respond to one or more tags based on the identifiers recovered in step 1408. For example, the reader may respond to a single tag by forming and transmitting an acknowledgement command with one tag identifier. As another example, the reader may respond to multiple tags by superimposing multiple tag identifiers and forming and transmitting an acknowledgement command with the combined tag identifiers. In some embodiments, if multiple tags provide the same identifier, the reader may transmit an acknowledgement command having that same identifier, which the multiple tags may subsequently respond to. In other embodiments, the reader may form multiple acknowledgement commands, each formed based on a different tag identifier, and sequentially transmit the multiple acknowledgement commands.

In some embodiments, the reader may also determine whether to respond to any tags, and if so which particular tags to respond to. For example, the reader may store or have access to a list of tags, and may select particular tags to respond to based on the list. The list of tags may identify whether a particular tag has been previously observed, and if so the number of times the tag has been observed within a particular past time duration. In this case, the reader may selectively respond to detected tags that (a) have not been previously detected or (b) have not been detected for some time duration, and may not respond to detected tags that (c) have been previously detected or (d) was recently detected. If the reader decides not to respond to a particular detected tag, it may either discard the recovered reply associated with that tag (or the data encoded in the recovered response) or may store the recovered reply for subsequent use (e.g., to acknowledge the tag at some later time).

As described above, in some embodiments the reader may use an acknowledgement command (similar to the ACK command of the Gen2 Specification), or may use a nonacknowledgement command (similar to the NAK command of the Gen2 Specification) to acknowledge tags. In other embodiments, the reader may use a non-Gen2 acknowledgement process capable of acknowledging multiple tags in sequence within the same inventory round or without having to transmit another query-type command.

The operations described in processes 1100 and 1400 are for illustrative purposes only. These operations may be implemented using additional or fewer operations and in different orders using the principles described herein. For example, in some embodiments a received response may be a combination of three or more individual tag signals, and the operations and processes described above may be used to recover each individual tag signal.

While diagrams 900 and 1200 depict situations in which a collided reply waveform includes replies from two different tags, in other embodiments a collided reply waveform may include replies from three or more different tags. A reader may attempt to recover multiple tag replies from every received reply waveform, or may determine whether a received reply waveform is likely to be a collided reply waveform before performing multiple tag reply recovery. For example, as described above, the reader may determine whether a received response is likely to be a collided reply waveform based on overall signal strength/power or variation thereof, signal noisiness, signal length, signal phase, signal angle-of-arrival, signal peak-to-average ratio, signal spectrum, signal bandwidth, signal amplitude variation, or any other suitable signal indicator or parameter. In some embodiments, a reader may be more likely to perform multiple tag reply recovery based on the number and/or rate of detection of unique tags. For example, if a reader detects that a rate of detection of unique tags has decreased, it may increase the probability of performing multiple tag reply recovery.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or S cells, and so forth.

We claim:

1. A method to resolve collided radio-frequency identification (RFID) tag replies, the method comprising:
    transmitting a request for a tag identifier;
    receiving a first collided reply waveform including at least two collided replies from at least two tags; and
    recovering, from the first collided reply waveform, at least a first reply from a first tag and a second reply from a second tag.

2. The method of claim 1, wherein:
    the first reply includes an identifier for at least one of the first tag and a first item associated with the first tag; and
    the second reply includes an identifier for at least one of the second tag and a second item associated with the second tag, wherein the identifiers include at least one of a tag identifier, an item identifier, an electronic product code, and a random number.

3. The method of claim 1, wherein recovering at least the first and second replies comprises:
    storing the first collided reply waveform in a sampled-waveform buffer;
    subtracting the first reply from the stored first collided reply waveform to form a modified reply waveform; and
    recovering the second reply from the modified reply waveform.

4. The method of claim 1, further comprising:
    determining that the first and second replies encode the same value;
    receiving a second collided reply waveform including two other collided replies from the first tag and the second tag; and
    recovering, from the second collided reply waveform, a first identifier for the first tag and a second identifier for the second tag.

5. The method of claim 1, wherein recovering at least the first and second replies comprises:
    determining that a characteristic of the first collided reply waveform is representative of a combination of at least two collided replies; and
    in response to determining the characteristic is representative of the combination of the at least two collided replies, recovering the first and second replies from the first collided reply waveform.

6. The method of claim 5, wherein the characteristic includes at least one of a noise parameter, a signal length, a signal strength, a phase parameter, a peak-to-average ratio, a spectrum, a bandwidth, and an amplitude variation.

7. The method of claim 1, wherein the first and second replies are at least partially superimposed on each other within the first collided reply waveform.

8. The method of claim 1, further comprising:
    determining whether the first tag has been previously observed; and
    in response to determining that the first tag has been previously observed, transmitting an acknowledgement signal based on the second reply.

9. A method to resolve collided radio-frequency identification (RFID) tag replies, the method comprising:
    transmitting a request for a tag identifier;
    receiving a first collided reply waveform including at least two collided replies from at least two tags;

recovering, from the first collided reply waveform, at least a strong reply from a first tag and a weak reply from a second tag; and transmitting an acknowledgement signal based on the weak reply.

10. The method of claim 9, wherein:

the strong reply includes an identifier for at least one of the first tag and a first item associated with the first tag; and the weak reply includes an identifier for at least one of the second tag and a second item associated with the second tag, wherein the identifiers include at least one of a tag identifier, an item identifier, an electronic product code, and a random number.

11. The method of claim 9, wherein recovering at least the strong and weak replies comprises:

storing the first collided reply waveform in a sampled-waveform buffer;

subtracting the strong reply from the stored first collided reply waveform to form a modified reply waveform; and recovering the weak reply from the modified reply waveform.

12. The method of claim 9, further comprising one of:

storing a value encoded in the strong reply; and discarding the strong reply.

13. The method of claim 9, wherein recovering at least the strong and weak replies comprises:

determining that a characteristic of the first collided reply waveform is representative of a combination of at least two collided replies; and in response to determining the characteristic is representative of the combination of the at least two collided replies, recovering the strong and weak replies from the first collided reply waveform.

14. The method of claim 13, wherein the characteristic includes at least one of a noise parameter, a signal length, a signal strength, a phase parameter, a peak-to-average ratio, a spectrum, a bandwidth, and an amplitude variation.

15. A method to resolve collided radio-frequency identification (RFID) tag replies, the method comprising:

transmitting a request for a tag identifier;

receiving a first collided reply waveform including at least two collided replies from at least two tags;

storing the first collided reply waveform in a sampled-waveform buffer, recovering a first reply from a first tag from the first collided reply waveform;

reconstructing a first reply waveform corresponding to the first reply;

subtracting the first reply waveform from the stored first collided reply waveform to form a modified reply waveform; and recovering a second reply from a second tag from the modified reply waveform.

16. The method of claim 15, wherein:

the first reply includes an identifier for at least one of the first tag and a first item associated with the first tag; and the second reply includes an identifier for at least one of the second tag and a second item associated with the second tag, wherein the identifiers include at least one of a tag identifier, an item identifier, an electronic product code, and a random number.

17. The method of claim 15, further comprising one of:

storing a value encoded in the first reply; and discarding the first reply.

18. The method of claim 15, wherein recovering at least the first and second replies comprises:

determining that a characteristic of the first collided reply waveform is representative of a combination of at least two collided replies; and in response to determining the characteristic is representative of the combination of the at least two collided replies, recovering the first and second replies from the first collided reply waveform.

19. The method of claim 18, wherein the characteristic includes at least one of a noise parameter, a signal length, a signal strength, a phase parameter, a peak-to-average ratio, a spectrum, a bandwidth, and an amplitude variation.

20. The method of claim 15, further comprising:

determining whether the first tag has been previously observed; and in response to determining that the first tag has been previously observed, transmitting an acknowledgement signal based on the second reply waveform.

* * * * *